May 1, 1951

R. LEE 2,551,021

SPEED GOVERNING APPARATUS

Filed Feb. 23, 1945

INVENTOR
ROYAL LEE
BY Christopher L. Waal
ATTORNEY

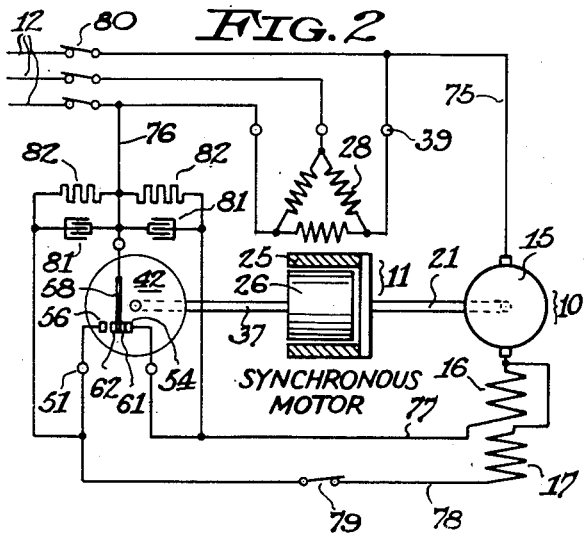
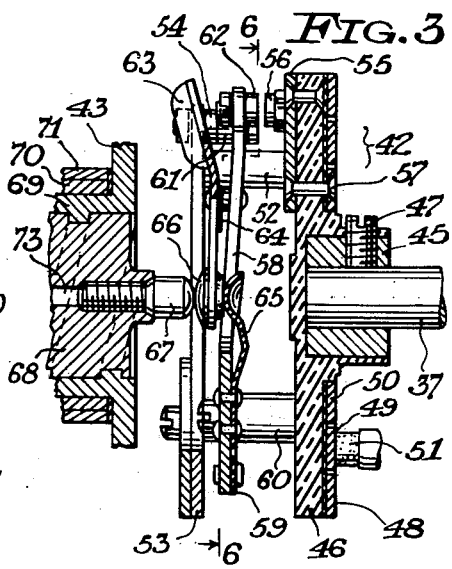
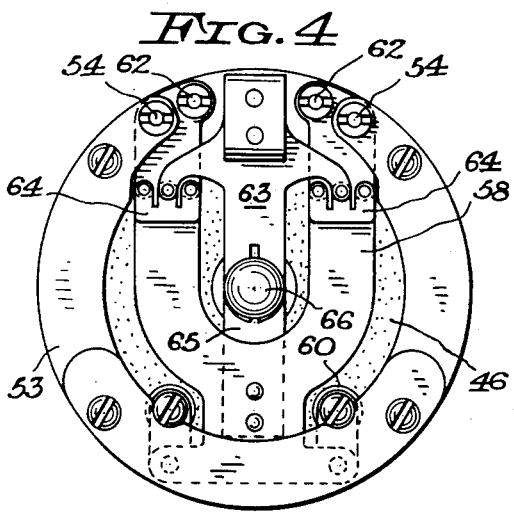
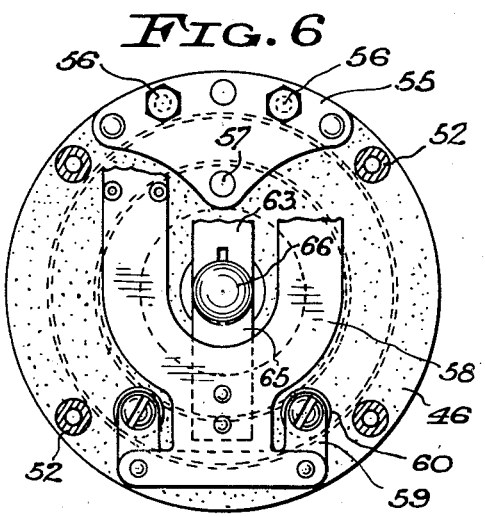
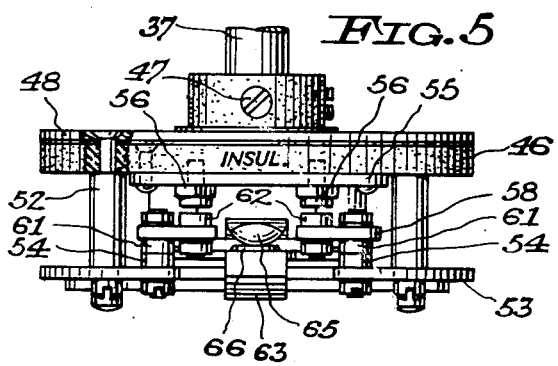
INVENTOR
ROYAL LEE

May 1, 1951 R. LEE 2,551,021
SPEED GOVERNING APPARATUS
Filed Feb. 23, 1945 3 Sheets-Sheet 3
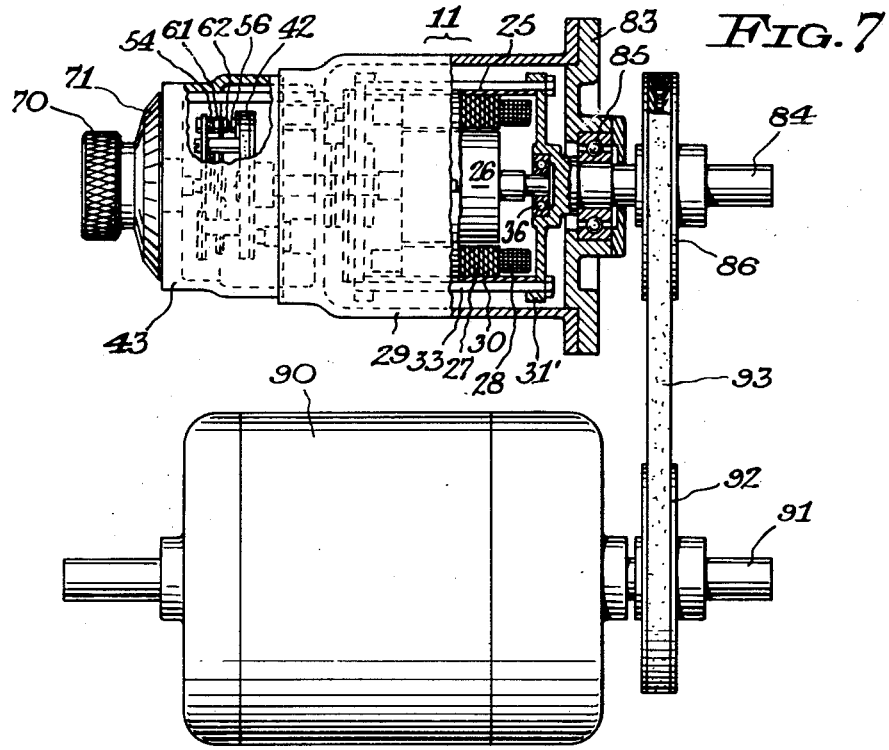
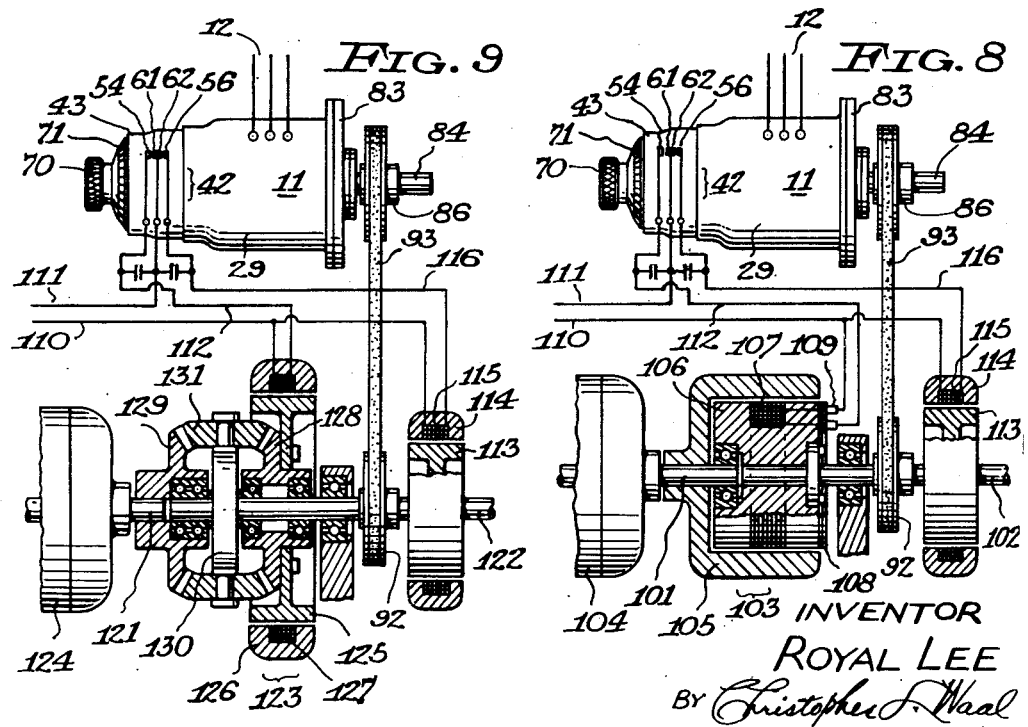
INVENTOR
ROYAL LEE
BY Christopher L. Waal
ATTORNEY Patented May 1, 1951

2,551,021

UNITED STATES PATENT OFFICE 2,551,021

SPEED GOVERNING APPARATUS

Royal Lee, Elm Grove, Wis., assignor to Lee Engineering Research Corporation, Milwaukee, Wis. a corporation of Wisconsin Application February 23, 1945, Serial No. 579,463

13 Claims. (Cl. 318—320)

The present invention relates to speed governing apparatus.

An object of the invention is to provide improved speed regulating or governing means which shall permit smooth operation of a rotatable member at relatively low speeds, even down to zero speed, and which shall also permit operation of the rotatable member over a wide range of governed speeds.

Another object of the invention is to provide speed regulating means which shall permit operation of the rotatable member through a continuous range of forward and reverse speeds.

A further object is to provide speed regulating means which shall prevent over-running of the rotatable member beyond a predetermined speed by the load connected to the rotatable member.

A still further object is to provide speed regulating means including a centrifugal device which is operated at a relatively high speed even at low speeds of the rotatable member, thus insuring sensitive and efficient action of the device.

The invention further consists in the several features hereinafter described and claimed.

In the accompanying drawings, illustrating certain embodiments of the invention, Fig. 1 is a longitudinal sectional elevation of an electric motor and associated speed regulating means arranged in accordance with the invention;

Fig. 2 is a schematic wiring diagram of the motor system;

Fig. 3 is a sectional elevation of a governor switch for the motor;

Fig. 4 is a front elevation of the switch;

Fig. 5 is a top view of the switch;

Fig. 6 is a sectional elevation of the switch taken generally along the line 6—6 of Fig. 3;

Fig. 7 is a view, partly in section, of a modified form of speed governing apparatus;

Fig. 8 is a view, partly in section, of another modified form of speed governing apparatus, and Fig. 9 is a view, partly in section, of a further modified form of speed governing apparatus.

Referring to the form of the invention illustrated in Figs. 1 to 6 of the drawings, the numeral 10 designates a main electric motor of a variable speed type, and the numeral 11 designates an auxiliary constant speed motor. The main motor 10 is here shown to be a series or universal motor, although other variable speed motors, such as the repulsion type, may be used. The auxiliary motor 11 is preferably of the self-starting synchronous type, here shown to be connected to three-phase mains 12, Fig. 2, two of which serve to supply the main motor with single-phase current. In some instances, the main motor may be operated on direct current.

The main motor 10 comprises a frame 13 which supports therein a stator or field core 14 cooperating with a wound rotor or armature 15. The field core carries field windings 16 and 17, which are selectively energized, as hereinafter described, to permit rotation of the armature in either direction. The armature windings are connected to a commutator 18 on which bear brushes 19 carried on a suitable holder 20. A shaft 21 for the armature is journalled in ball-bearings 22 mounted in end bells 23 and 24 of the motor frame.

The auxiliary motor 11 comprises a pair of relatively rotatable outer and inner members 25 and 26, both of which are rotatable. The outer member corresponds to the stator of a conventional synchronous motor and has a core 27 provided with a three-phase winding 28. The inner member or rotor 26 may be of the conventional salient pole squirrel-cage type for induction starting. One end of the main motor shaft 21 is coupled or connected to one of the relatively rotatable members 25 and 26 of the auxiliary motor, preferably the outer member 25, as shown. The two motors are preferably arranged coaxially so as to permit a direct drive between them. The auxiliary motor is disposed in a cup-shaped housing 29 which is secured to the end bell 24 of the main motor. The core 27 of the auxiliary motor is carried in a tubular shell 30 which is rigidly secured to end plates 31 and 32, as by clamping screws 33. The end plate 31 is splined to the main motor shaft 21 and is thus rotatably supported, and the end plate 32 is rotatably carried on a ball-bearing 34 mounted on a sleeve 35 secured to the end wall of the housing 29. The rotatable end plates 31 and 32 carry respective ball-bearings 36 in which is journalled a shaft 37 for the rotor 26. To supply current to the three-phase winding 28, the end plate 32 is provided with three slip rings 38 engaged by brushes 39 (one being shown in Fig. 1) carried by the end wall of the housing 29. A tubular cover 40 encloses the housing 29 and end bell 24 and is detachably secured to the end bell, as by screws 41.

The auxiliary motor 11 serves to drive the rotary parts of a centrifugal governor switch 42 which controls the speed of the main motor 10. The switch construction illustrated is similar in some respects to that shown in my United States Patent No. 2,291,639 for Centrifugal Switch, dated August 4, 1942. The switch 42 is housed in a chamber formed by a cup-shaped casing 43 secured coaxially to the end of the housing 29, as by screws 44. The shaft 37 of the auxiliary motor projects through the end wall of the housing 29 and has mounted thereon a rotatable member comprising a metal hub 45 (Fig. 3) rigidly carrying thereon a disk 46 of insulating material, the hub being secured to the shaft, as by set screws 47. Collector rings 48, 49, and 50 are secured to one side of the disk, and cooperate with brushes 51 (one being shown in Figs. 1 and 3) carried by the housing 29. Studs or posts 52 are secured to the other side of the disk and rigidly support thereon a generally circular C-shaped metal frame or plate 53 coaxial with the disk, the studs also electrically connecting the plate to the outermost collector ring 48. A pair of contacts 54 are detachably secured to the spaced end portions of the plate 53 and have their contact faces lying in a plane normal to the disk axis. A metal plate 55 is riveted to the same side of the disk as the studs 52 and carries a pair of contacts 56 similar to, but out of register with, the contacts 54, the plate 55 being electrically connected to the innermost slip ring 50, as by a rivet 57, Figs. 3 and 6.

Disposed between the insulating disk 46 and the metal plate 53 is a forked, plate-like, oscillatory lever 58 of light weight metal. The plane of the lever is approximately at right angles to the disk axis, and the longitudinal center line of the lever extends diametrically of the disk. The forked end of the lever is adjacent to the contacts 54 and 56, and the other end is mounted on a U-shaped leaf spring hinge 59 which is secured to studs 60 riveted to the disk 46 and electrically connected to the intermediate slip ring 49. Two pairs of contacts 61 and 62 facing in opposite directions are detachably secured to the free ends of the fork arms of the lever 58 and respectively cooperate with the contacts 54 and 56, the lever contacts 61 being normally urged or biased against the plate contacts 54 by the hinge spring 59. The effective hinge axis of the lever extends in a transverse direction with respect to the disk axis and at one side of the disk axis, while the contacts 54 and 61 are arranged at the opposite side of the disk axis. The lever contacts are movable in a direction approximately parallel to the disk axis.

The oscillatory lever 58 carries thereon a weighted centrifugally actuated member 63 which is shiftable with respect to the lever to insure satisfactory operation of the switch throughout a wide range of speed settings. The member 63 is preferably in the form of an auxiliary lever of angular shape which is hinged intermediate its ends on the forks of the oscillating lever 58, as by leaf springs 64 of E-shaped configuration, the effective hinge axis of the auxiliary lever being parallel to the hinge axis of the oscillatory lever. The auxiliary lever is biased by the springs 64, and, if desired, by an additional leaf spring 65 which is riveted to the oscillatory lever. The inner end of the auxiliary lever is disposed at the axis of the disk and carries a rounded button 66 of metal or insulating material, the button 66 being urged outwardly by the hinge springs 64 and biasing spring 65.

To adjust the speed-setting of the switch, the button 66 is urged inwardly by an axially movable actuator 67. The actuator 67 is here shown to be a button-headed screw of metal or insulating material secured in a plug 68 which has a screw-threaded fit in a tubular extension 69 of the casing 43, the actuator and plug being coaxial with the shaft 37. The plug 68 is turned in any suitable manner, as by a knob 70 rotatably mounted on the extension 69 and carrying a calibrated dial 71, the knob carrying a central tang 72 (Fig. 1) which is splined in a transverse slot 73 (Fig. 3) formed in the plug. The calibrated dial 71 cooperates with an index member 74 carried on the casing 43.

One terminal of the main motor 15 is connected to one of the mains 12 by a conductor 75, and the contacts 61 and 62 on the oscillatory lever 58 of the centrifugal switch 42 are connected to another of the mains by a conductor 76. The switch contacts 54 are connected to the "forward" field winding 16 of the main motor by a conductor 77, and the switch contacts 56 are connected to the "reverse" field winding 17 of the main motor by a conductor 78. If desired, a switch 79 may be interposed in the conductor 78, and a control switch 80 may be provided in the three-phase mains 12. The connections to the centrifugal switch contacts are made through the brushes 51 and the slip rings 48, 49, and 50. The centrifugal switch contacts are suitably protected against sparking, as by shunting condensers 81 and resistors 82.

In operation, the rotor 26 of the auxiliary motor 11 rotates at a constant speed relative to the companion member 25. By way of example, this speed may be, say, 1800 R. P. M., which is sufficiently high to insure good performance of the centrifugal switch. If the centrifugal switch is set to operate at 1800 R. P. M., then the contacts 54 and 61 will remain open and no current will flow through the windings of the main motor 10, the rotor or armature of which will therefore remain at rest. If now the centrifugal switch is set to operate at 1810 R. P. M., current will flow through the switch contacts 54 and 61 and the "forward" field winding 16 and rotor 15 of the main motor 10, causing this motor, and also the outer member 25 of the auxiliary motor, to start rotating in a forward direction. This causes the rotor 26 of the auxiliary motor to increase in speed by the same amount until the speed of the rotor 26 reaches an absolute speed of 1810 R. P. M., the relative speed of the rotor 26 with respect to the member 25 remaining at 1800 R. P. M. The contacts 54 and 61 then open so that the speed of the rotor of the main motor does not exceed 10 R. P. M. A very slight decrease in speed then causes the contacts 54 and 61 to reclose, whereupon the main motor is again energized, and the cycle of operation is repeated. In practice, the contacts 61 will vibrate at a relatively high frequency, say 50 to 500 cycles per second, thus insuring good speed regulation. The main motor will operate smoothly at 10 R. P. M. (as well as at any lower governed speed down to zero) at any load within the capacity of the motor, and will be capable of exerting considerable torque. This feature permits smooth "inching" of the main motor when this mode of operation is required. The centrifugal switch can be adjusted through a continuous range to a much higher speed-setting, say 7800 R. P. M., whereupon the main motor will run at a governed speed of 6000 R. P. M.

By turning the dial 70 to a speed-setting below 1800 R. P. M., the contacts 56 and 62 will come into action and cause operation of the main motor in a reverse direction, the main motor current then passing through the "reverse" field winding 17. If the speed-setting of the centrifugal switch is, say, 1790 R. P. M., then the speed of the main motor will be 10 R. P. M. in reverse direction, and if the speed-setting is, say, 800 R. P. M., then the speed of the main motor will be 1000 R. P. M. in reverse direction. With an auxiliary motor having a relative speed of 1800 R. P. M., the theoretical maximum in main motor speed in reverse direction is 1800 R. P. M., but this could not be attained in practice as the centrifugal governor switch will not operate in a satisfactory manner at low speeds. If a main motor speed higher than 1800 R. P. M. in reverse direction is required, an auxiliary motor with a higher operating speed, say 3600 R. P. M., may be provided; or the motor 11 may be reversed.

It will be seen that the wide continuous range of forward and reverse motor speeds can be obtained by the movement of a simple knob or other suitable actuator. The auxiliary motor 11 can be relatively small as the load on this motor is comparatively light.

In some instances, a load, such as a hoisting load, on the main motor may tend to cause this motor to operate above the governed speed, unless an irreversible drive is employed. However, if such a tendency should be present, the normally inactive one of the two centrifugal switch contacts 61 and 62 will come into action and cause a flow of "plugging" current through the motor tending to reverse the motor, thus exerting a braking influence on the motor.

In cases where reversal of the main motor is not required, the circuit through the reversing field winding of the main motor may be opened at the switch 79, or this field winding and the associated centrifugal switch contacts may be omitted.

In the modified form of apparatus shown in Fig. 7, the governor switch and synchronous motor form a self-contained governor unit which can readily be applied to various machines. The housing 29 for the synchronous motor 11 is provided with a cover plate 83 at the end remote from the governor switch 42. The outer rotatable member 25 of the synchronous motor includes an end disk 31' which has a stub shaft 84 journalled in a ball bearing 85 in the cover plate. The stub shaft is here shown to carry a pulley 86. The governor unit is otherwise the same as that of Fig. 1.

In Fig. 7, the machine to be governed is a variable speed electric motor 90 having an armature shaft 91. A pulley 92 on the armature shaft is connected by a V-belt 93 to the pulley 86 on the governor unit shaft 84, thus providing a driving connection between the motor and the governor unit. In some instances, other types of drives may be used, such as an equivalent gear drive, not shown, or a direct drive similar to that of Fig. 1. The motor 10 may be similar to that of Fig. 1, and the wiring connections may be similar to those of Fig. 2. The operation of the apparatus is like that of Fig. 1.

In the modified form of apparatus shown in Fig. 8, a driving or input shaft 101 is coaxial with a suitably journalled driven or output shaft 102 and drives the latter shaft through a variably excited magnetic clutch 103, as of the eddy-current type. The input shaft 101 is suitably driven, as by a constant speed electric motor 104. The magnetic clutch comprises an outer magnetizable member 105 connected to the input shaft and an inner magnetizable member 106 connected to the output shaft, the latter member carrying an annular magnetizing winding 107. Current, either direct or alternating, is conducted to the magnetizing winding through slip rings 108 and brushes 109, the current being supplied from line conductors 110 and 111. The driven shaft 102 carries a pulley 92 which is connected by a V-belt 93 to the pulley 86 of the governor unit, as in the apparatus of Fig. 7. The line conductor 110 is connected to one of the brushes 109, and the line conductor 111 is connected to the governor switch contact 61, the cooperating switch contact 54 being connected to the other brush 109 by a conductor 112. The governor switch controls the magnetizing current of the clutch to vary the clutch slip, thus governing the speed of the output shaft 102.

In cases where it is desired to prevent overrunning of the output shaft by a connected load, this shaft may be controlled by a magnetic brake, as of the eddy current type. The brake comprises a magnetizable rotor 113 carried on the output shaft and cooperating with a magnetizable stator 114 provided with a magnetizing winding 115, the latter being supplied with current from the line conductors 110 and 111. The line conductor 110 is connected to one terminal of the winding 115, and the line conductor 111 is connected to the governor switch contact 62, the cooperating switch contact 56 being connected to the other terminal of the winding 115 by a conductor 116. The brake winding 115 is energized when the contacts 56 and 62 engage.

In the operation of the apparatus of Fig. 8, the governor switch disk 46 rotates at a speed which is the sum of the synchronous motor speed plus a quantity proportional to the speed of the output shaft 102, the proportionality depending on the speed ratio of the belt drive. When the output shaft is at rest the governor speed is the synchronous motor speed, say 1800 R. P. M. If the governor contacts 54 and 61 are set to open at 1800 R. P. M., (or at any lower speed), then no current will flow through the clutch winding 107 and the output shaft 102 will remain at rest, the clutch slip being 100%. If the governor contacts 54 and 61 are set to open at, say, 1900 R. P. M., the clutch winding will be fully excited until the speed of the governor unit shaft 84 rises to 100 R. P. M. Assuming a speed ratio of unity for the belt drive, this corresponds to a speed of 100 R. P. M. of the output shaft 102. The governor contacts 54 and 61 then open and the exciting current drops, increasing the slip of the clutch. A slight decrease of governor speed, however, causes the contacts to reclose, again establishing the exciting current, and the cycle of operation is repeated, as in the apparatus of Fig. 1, with the result that the speed of the output shaft remains substantially constant at the adjusted value. With the construction shown, the maximum speed of the output shaft 102 cannot exceed the speed of the input shaft 101. In a clutch of the type described, the minimum slip can be made quite small, on the order of 1%.

If the speed of the output shaft should rise slightly above the adjusted value, as by a connected load, the contacts 56 and 62 will close and energize the brake winding 115, thus avoiding over-running of the output shaft.

In the modified form of apparatus shown in Fig. 9, a planetary or differential gear is provided in conjunction with a magnetic clutch 123. An input shaft 121, such as the shaft of an electric motor 124, is coaxial with an output shaft 122. The magnetic clutch 123 comprises a rotor 125 and a stator 126, the latter carrying a magnetizing winding 127. The clutch rotor is carried on a bevel gear 128 which is rotatably mounted coaxially of the output shaft and is capable of free rotation when the magnetizing winding is not energized. The input shaft 121 carries a similar bevel gear 129. The output shaft 122 has secured thereto a planet carrier 130 on which are mounted planet pinions 131 meshing with the bevel gears 128 and 129. A magnetic brake is provided for the output shaft, and the clutch and brake windings are controlled by the governor switch, as in the apparatus of Fig. 8. The output shaft is belt-connected to the governor unit shaft, as in Fig. 7.

In the operation of the apparatus of Fig. 9, power is transmitted from the input shaft 121 to the output shaft 122 through the bevel gear 129 and the pinions 131 on the planet carrier 130. If the bevel gear 128 is restrained against rotation by the magnetic clutch 123, the output shaft rotates at one-half the speed of the input shaft, the pinions 131 rolling around the stationary bevel gear 128. If the bevel gear 128 is free to rotate, as by deenergizing the clutch winding 127, the output shaft remains at rest and the bevel gear 128 rotates at the same speed as the input bevel gear 129 but in the opposite direction. The governor switch serves to control the excitation of the clutch winding 127 and thus governs the speed of the output shaft. Over-running of the output shaft by a connected load is prevented by the magnetic brake, as in the apparatus of Fig. 8.

What I claim as new and desire to secure by Letters Patent is:

1. In combination, a main electric motor having a rotor, an auxiliary electric motor having first and second relatively rotatable members both of which are rotatable, said first rotatable member of the auxiliary motor being drivingly connected with the rotor of the main motor, and means for regulating the speed of the main motor comprising centrifugal speed-responsive switch means having a circuit connection with said main motor and actuated by the second rotatable member of the auxiliary motor, the absolute speed of rotation of said second rotatable member of the auxiliary motor being higher than that of said first rotatable member.

2. In combination, a main electric motor having a rotor, an auxiliary electric motor having outer and inner relatively rotatable members both of which are rotatable, said rotatable members of the auxiliary motor having a substantially constant speed of relative rotation, and said outer rotatable member of the auxiliary motor being drivingly connected with the rotor of the main motor, and means for regulating the speed of the main motor comprising centrifugal speed-responsive switch means having a circuit connection with said main motor and actuated by the inner rotatable member of the auxiliary motor, the absolute speed of rotation of said inner rotatable member of the auxiliary motor being higher than that of said outer rotatable member.

3. In combination, a main electric motor having a rotor, a synchronous motor having first and second relatively rotatable members both of which are rotatable, said first rotatable member of the synchronous motor being drivingly connected with the rotor of the main motor, and speed-responsive switch having a circuit connection with said main motor and controlled by the second rotatable member said synchronous motor for regulating the speed of the main motor, the absolute speed of rotation of said second rotatable member of the auxiliary motor being higher than that of said first rotatable member.

4. In combination, a reversible electric motor, centrifugal switch means connected in circuit with said motor for governing the speed of the motor, rotatable means for driving said switch means at a given speed when the motor is at rest, and motor-speed-responsive means cooperating with said rotatable means for driving said switch means at a higher speed when the motor is running in one direction and at a lower speed when the motor is running in the other direction.

5. In combination, an electric motor having first and second relatively rotatable elements both of which are rotatable, said first rotatable element being adapted for driving connection with a rotatable member the speed of which is to be regulated, and means for regulating the speed of the rotatable member comprising an electromagnetic winding and centrifugal speed-responsive switch means having a circuit connection with said winding and actuated by the second rotatable element of said motor, the absolute speed of rotation of said second rotatable element being higher than that of said first rotatable element.

6. In combination, a rotatable member, a pair of electromagnetic control windings for said member, means including a current-limiting speed-responsive switch section in circuit with one of said windings for governing the speed of said member, braking means including a second speed-responsive switch section in circuit with the other of said windings for resisting over-running of said rotatable member above the governed speed, and an electric motor having first and second rotatable elements both of which are rotatable, said first rotatable element being drivingly connected with said rotatable member, and said second rotatable element being drivingly connected with said speed-responsive switch sections and having an absolute speed of rotation higher than that of said first rotatable element.

7. In combination, an electric motor having first and second relatively rotatable elements both of which are rotatable, rotatable input and output members, magnetic clutch means for said members including a magnetizing winding, said first motor element being drivingly connected to said output member, and means for regulating the speed of said output member comprising centrifugal speed-responsive switch means actuated by the second motor element and connected in circuit with said magnetizing winding for controlling the flow of current through said magnetizing winding, the absolute speed of said second motor element being higher than that of said first motor element.

8. In combination, an electric motor having first and second relatively rotatable elements both of which are rotatable, rotatable input and output members, clutch means for said members including an electromagnetic winding, said first motor element being drivingly connected to said output member, brake means for said output member including an electromagnetic winding, and means for governing the speed of said output member comprising centrifugal speed-responsive switch means actuated by the second motor element and connected in circuit with said windings for controlling said clutch means and brake means, the absolute speed of said second motor element being higher than that of said first motor element.

9. In combination, an electric motor having first and second relatively rotatable elements, rotatable input and output members, magnetic clutch means for said members including rotatable clutch elements on said respective members, a magnetizing winding on one of said clutch elements, said first motor element being drivingly connected to said output member, and means for regulating the speed of said output member comprising centrifugal speed-responsive switch means actuated by the second motor element and connected in circuit with said magnetizing winding for controlling the flow of current through said magnetizing winding, the absolute speed of said second motor element being higher than that of said first motor element.

10. In combination, an electric motor having first and second relatively rotatable elements, rotatable input and output members, a planetary gear connecting said members, clutch means for said gear including an electromagnetic actuating winding, said first motor element being drivingly connected to said output member, and means for regulating the speed of said output member comprising centrifugal speed-responsive switch means actuated by the second motor element and connected in circuit with said winding for controlling said clutch means, the absolute speed of said second motor element being higher than that of said first motor element.

11. In combination, a main electric motor having a rotor and having a power winding and a braking winding, motor-speed-responsive centrifugal switch means including a switch section having a circuit connection with said power winding for governing the speed of the main motor and a normally inactive second switch section having a circuit connection with said braking winding for resisting overruning of the main motor above the governed speed, and an auxiliary electric motor having first and second rotatable elements both of which are rotatable and having a substantially constant speed of relative rotation, said first rotatable element being drivingly connected to the rotor of the main motor, and said second rotatable element being drivingly connected to said centrifugal switch means and having an absolute speed of rotation higher than that of said first rotatable element.

12. In combination, a reversible main electric motor having a rotor and having winding means providing for forward and reverse rotation, speed control centrifugal switch means for said motor including a motor-speed-responsive switch section having a circuit connection with said winding means for governing the speed of the main motor in forward direction, and said speed control means including a second motor-speed-responsive switch section having a circuit connection with said winding means for governing the speed of the main motor in reverse direction, and an auxiliary electric motor having first and second rotatable elements both of which are rotatable and having a substantially constant speed of relative rotation, said first rotatable element being drivingly connected to the rotor of the main motor, and said second rotatable element being drivingly connected to said centrifugal switch means.

13. In combination, a reversible main electric motor having a rotor and having winding means providing for forward and reverse rotation, an auxiliary constant speed electric motor having first and second relatively rotatable elements both of which are rotatable, said first motor element being drivingly connected to said rotor, and speed control centrifugal switch means for said motor drivingly connected to said second motor element and including a motor-speed-responsive switch section having a circuit connection with said winding means for governing the speed of the motor in forward direction, and said speed control means including a second motor-speed-responsive switch section having a circuit connection with said winding means for governing the speed of the motor in reverse direction, and a speed-setting actuator operable while the motor is running for controlling both of said switch sections to provide a selected motor speed in either forward or reverse direction.

ROYAL LEE.

REFERENCES CITED

The following references are of record in the file of this patent:

UNITED STATES PATENTS

| Number | Name | Date |
|---|---|---|
| Re. 22,432 | Winther | Feb. 1, 1944 |
| 1,334,868 | Laycock | Mar. 23, 1920 |
| 1,359,616 | Murray | Nov. 23, 1920 |
| 1,476,458 | Murray | Dec. 4, 1923 |
| 1,506,453 | Shaifer | Aug. 26, 1924 |
| 1,857,202 | Lee | May 10, 1932 |
| 2,298,120 | Geiselman | Oct. 6, 1942 |
| 2,333,863 | Hull | Nov. 9, 1943 |
| 2,395,080 | Stoller | Feb. 19, 1945 |

FOREIGN PATENTS

| Number | Country | Date |
|---|---|---|
| 68,241 | Switzerland | Mar. 21, 1914 |
| 562,312 | Germany | Oct. 6, 1932 |